United States Patent [19]
Hoshiya et al.

[11] Patent Number: 6,009,414
[45] Date of Patent: Dec. 28, 1999

[54] COMPUTER SYSTEM WITH CHECKPOINT FACILITY AND ACCOUNTING FACILITY INDICATING CHARGES PAYABLE FOR PROCESSES

[75] Inventors: Takayuki Hoshiya; Tsutomu Watanabe; Takeshi Suzuki, all of Kawasaki, Japan

[73] Assignee: Fujitsu Limited, Kawasaki, Japan

[21] Appl. No.: 08/892,671

[22] Filed: Jul. 14, 1997

[30] Foreign Application Priority Data

Dec. 16, 1996 [JP] Japan .................................. 8-335890

[51] Int. Cl.⁶ ............................. G06F 17/00; G06F 11/00
[52] U.S. Cl. .............................................. 705/30; 714/13
[58] Field of Search .................. 705/30, 32; 395/182.11; 714/13

[56] References Cited

U.S. PATENT DOCUMENTS

| | | | |
|---|---|---|---|
| 4,802,117 | 1/1989 | Chrosny et al. | 364/900 |
| 4,845,635 | 7/1989 | Kroll et al. | 364/464.02 |
| 5,109,507 | 4/1992 | Check, Jr. | 395/575 |
| 5,421,003 | 5/1995 | Escola et al. | 395/575 |
| 5,421,011 | 5/1995 | Camillone et al. | |
| 5,530,801 | 6/1996 | Kobayshi | 395/182.11 |
| 5,682,517 | 10/1997 | D'Andrea et al. | 395/489 |
| 5,825,883 | 10/1998 | Archibald et al. | 705/30 |
| 5,828,821 | 10/1998 | Hoshina et al. | 714/13 |
| 5,884,021 | 3/1999 | Hirayama et al. | 714/13 |
| 5,933,593 | 8/1999 | Arun et al. | 714/6 |

FOREIGN PATENT DOCUMENTS

| | | |
|---|---|---|
| 0 265 183 | 4/1988 | European Pat. Off. . |
| 0 164 673 | 12/1988 | European Pat. Off. . |
| 12501831 | 1/1969 | Germany . |
| 2 301 205 | 11/1996 | United Kingdom . |
| 88/02960 | 4/1988 | WIPO . |

OTHER PUBLICATIONS

*IBM Technical Disclosure Bulletin*, Jan. 1994, pp. 209–211.
*Deutsches Patentamt*, 123PAT304–DE, Nov. 1998.
Translation of 123PAT304–DE.

*Primary Examiner*—Allen R. MacDonald
*Assistant Examiner*—Michele Stuckey Crecca
*Attorney, Agent, or Firm*—Staas & Halsey LLP

[57] ABSTRACT

In a computer system provided with a checkpoint facility, an accounting record indicating a charge payable as a result of a normal process and an accounting record indicating a charge payable as a result of a checkpoint process are output separately.

When a file is accessed, a determination is made as to whether the access occurs subsequent to the checkpoint process and whether the accessed file has not been saved. If it is determined that the access occurs subsequent to the checkpoint process and the accessed file has not been saved, the accessed file is appended to the saved information.

13 Claims, 9 Drawing Sheets

FIG. 2

| JOB IDENTIFIER |
| --- |
| CHECKPOINT COMPLETION FLAG |
| CHECKPOINT FILE NAME |
| PROCESS IDENTIFIER 1 |
| PROCESS IDENTIFIER 2 |
| ⋮ |
| SAVED FILE NAME-1 |
| SAVED FILE NAME-2 |
| ⋮ |

FIG. 3

| PROCESS IDENTIFIER |
| --- |
| JOB IDENTIFIER |
| USER IDENTIFIER |
| USED CPU TIME |
| I/O VOLUME |
| USER IDENTIFIER SAVE AREA |
| USED CPU TIME SAVE AREA |
| I/O VOLUME SAVE AREA |

FIG. 4

| USER IDENTIFIER | USED CPU TIME | I/O VOLUME |
|---|---|---|

FIG. 5

| USER IDENTIFIER | JOB IDENTIFIER |
|---|---|

| PROCESS IDENTIFIER |
|---|
| JOB IDENTIFIER |
| USER IDENTIFIER |
| USED CPU TIME |
| I/O VOLUME |
| USER IDENTIFIER SAVE AREA |
| USED CPU TIME SAVE AREA |
| I/O VOLUME SAVE AREA |
| SECOND USED CPU TIME SAVE AREA |
| SECOND I/O VOLUME SAVE AREA |

COMPUTER SYSTEM WITH CHECKPOINT FACILITY AND ACCOUNTING FACILITY INDICATING CHARGES PAYABLE FOR PROCESSES

BACKGROUND OF THE INVENTION

1. Field of the Invention

The present invention generally relates to computer systems, and more particularly, to a checkpoint and restart facility of a computer system.

2. Description of the Related Art

A computer system is composed of a CPU, a memory, an external storage device and terminal equipment, etc.

The CPU executes a program loaded into the memory.

An operating system (OS) is stored in the external storage device and is loaded into the memory when the computer system is started so as to control the computer system subsequently.

Like the OS, a user program is stored in the external storage device and is executed after being loaded into the memory by the OS according to an instruction from terminal equipment or the like.

Loading the entirety of a voluminous program or data into the memory is impossible since the size of the memory is limited. Therefore, a so-called virtual storage scheme is employed such that a process is carried out by exchanging portions of the program or the data between the memory and the external storage device.

The program is usually executed in units of execution which are called a process. One virtual space, composed of a virtual memory space and a virtual register etc., is allocated to one process. A job is composed of at least one process and job information to control the process.

Since a computer system is constructed such that it is used by a plurality of users and a plurality of programs are executed at the same time, the OS offers various functions.

For instance, the computer system offers a checkpoint and restart facility in preparation for a system down occurrence while a program is being executed.

A checkpoint facility provides for preservation of the runtime environment for each unit of execution such as an active job or an active process. A restart facility provides for restoration of the runtime environment preserved by the checkpoint facility and restarting of the execution of the program.

The OS provides system calls including a file input and output process for processes commonly executed by various user programs. The system call is like a subroutine for the process. When a system call is requested, the OS executes an associated process in a process space of the program requesting the system call. The user is charged an amount of money payable for the used CPU time in which the OS and the user program are run.

The following problems have been recognized in the checkpoint and restart facility of the related art.

With some checkpoint implementations, the runtime environment of the process provided with a checkpoint is preserved in some preceding system calls requested by the user program. That is, the checkpoint process is not distinguished from processes executed by the user program. As a result, the user is charged for the checkpoint process.

The checkpoint process may be executed at the system operator's discretion so that it is not desirable to uniformly charge the user for the process provided with a checkpoint. Herein lies a first problem in the checkpoint and restart facility according to the related art.

A second problem with the checkpoint and restart facility according to the related art is that account information is not output to an account file until a job is terminated.

All user programs may not end normally. Some store an intermediate output in a file during a process so as to continue the execution of the process later, using the intermediate output. In such cases, it is desirable for the operation of the system to charge the user for the process even if the program does not end normally.

When the checkpoint and restart process is executed, the user is charged for a job all over again when it is restarted. For example, the user is charged multiple times from a start time of a job to a checkpoint time when a job is provided with a checkpoint in a midpoint for the purpose of debugging etc. and restarted again from the checkpoint a plurality of times with different conditions.

A third problem is that only an active file (opened or accessed file) is preserved in the checkpoint process. More specifically, the restart process cannot restore the runtime environment only by the information preserved at the checkpoint, if a file other than the file preserved at the checkpoint is updated subsequent to the checkpoint process.

The third problem will be explained in detail below.

It is assumed that file A starts being used at time T0 and a checkpoint process is started at time T1. It is then assumed that the content of file B is referred to in process X at time T2 and file B is updated in process Y in time T3. When the runtime environment saved at time T1 is restored so that the process is restarted, the content of file B upon a restart of process X is different from what it was at time T2 because of process Y at time T3 and cannot be restored.

SUMMARY OF THE INVENTION

Accordingly, a general object of the present invention is provide a computer system in which the aforementioned problems are eliminated.

Another and more specific object of the present invention is to provide a computer system providing a more accurate accounting process than the conventional system.

The aforementioned objects are achieved by a computer system provided with an accounting facility, including a program executing unit executing a program and an output unit outputting, in the middle of an execution of a user program, accounting information indicating a charge payable as a result of the execution of the user program to an accounting file.

The aforementioned objects can also be achieved by a computer system provided with an accounting facility and checkpoint and restart processing facility, including a program executing unit executing a program and, an output unit outputting, when a checkpoint process for a user program is completed, accounting information indicating a charge payable as a result of an execution of the user program to an accounting file.

The aforementioned objects can also be achieved by a computer system provided with an accounting facility and checkpoint and restart processing facility, including a program executing unit executing a program and, an output unit outputting accounting information indicating a charge payable as a result of an execution of a user program and accounting information indicating a charge payable as a result of a checkpoint and restart process separately to respective accounting files.

The aforementioned objects can also be achieved by a computer system provided with an accounting facility and checkpoint and restart processing facility, including a program executing unit executing a program, an output unit outputting an accounting record for charging a user instructing a checkpoint and restart process for the checkpoint and restart process to an accounting file.

According to the computer system of the present invention, even if a system down state occurs in a computer system, an accounting process that matches an actual execution of a user program is possible.

The aforementioned objects can also be achieved by a computer system provided with a resource access facility and checkpoint and restart facility, including a program executing unit executing a program a saving unit saving contents of an active resource, a determining unit determining, in the event that a unit of execution accessing a resource is preserved as a checkpoint, whether the accessed resource has been saved, and a saving unit saving, when said determining unit determines that the accessed resource has not been saved, the accessed resource to be appended to the checkpoint (runtime environment).

The aforementioned objects can also be achieved by a computer system provided with a file access facility and checkpoint and restart facility, including a program executing unit executing a program, a saving unit saving contents of an active file, a determining unit determining, in the event that a unit of execution accessing a file is preserved as a checkpoint, whether the accessed file has been saved, a and a saving unit saving, when said determining unit determines that the accessed file has not been saved at preceding checkpoint, the accessed file to be appended to the checkpoint (runtime environment).

According to these aspects of the present invention, a file (or a computer resource) accessed subsequent to the checkpoint process is also automatically saved. Therefore, it is possible to restore a previous runtime environment when a job is re-executed.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
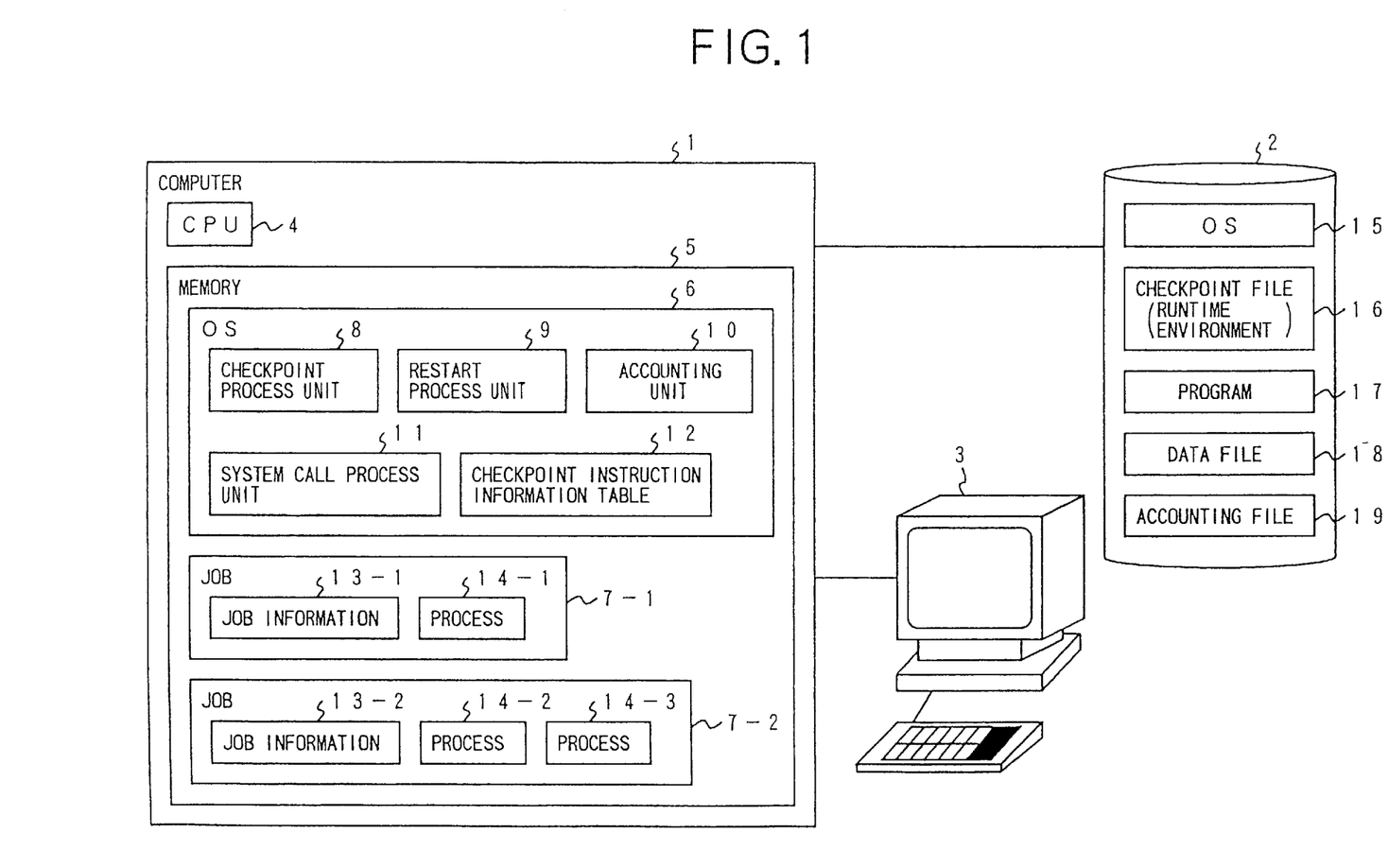
FIG. 1 shows the construction of a computer system according to an embodiment of the present invention.

FIG. 1 shows the construction of a computer system according to an embodiment of the present invention.

The computer system comprises a computer 1, an external storage device 2 and a terminal equipment unit 3. The computer 1 is composed of a CPU 4 and a memory 5. The memory 5 stores a loaded operating system (OS) 6 and jobs 7-1 and 7-2 (7-n).

The loaded OS 6 includes a checkpoint process unit 8, a restart process means 9, an accounting unit 10, a system call process unit 11 and a checkpoint instruction information table 12.

The checkpoint process unit 8 saves the runtime environment of a job in the external storage device 2 as a checkpoint file. The restart process unit 9 restores the runtime environment of the job saved as a file by the checkpoint process unit 8 in the external storage device 2. The accounting unit 10 manages, as account information, the input/output (I/O) volume and the used CPU time used when a program is run under the loaded OS 6.

Each of the jobs 7-1 and 7-2 (7-n) is composed of job information 13 and at least one process. Referring to FIG. 1, the job 7-1 includes job information 13-1 and a process 14-1. The job 7-2 includes job information 13-2 and processes 14-2 and 14-3. More generically described, a job 7-n includes job information 13-n and a process 14-n. The job information 13-n is information to control the job. The process 14-n is a minimum unit of execution of a program. Each process 14-n includes process management information shown in FIG. 3 for controlling the process.

An operating system 15, a checkpoint file 16, a program 17, a data file 18 and an accounting file 19 are stored in the external storage device 2. When the computer system is started, the operating system 15 is loaded into the memory 5 of the computer 1. The checkpoint file 16 is a file which stores the runtime environment of a job saved by the checkpoint process unit 8. The checkpoint file 16 may be a plurality of files instead of a single file.

The program 17 is executed under the loaded OS 6. The data file 18 is accessed by the program 17 while it is being executed. The accounting file 19 stores the account information managed by the accounting means 10.

Figure 2:
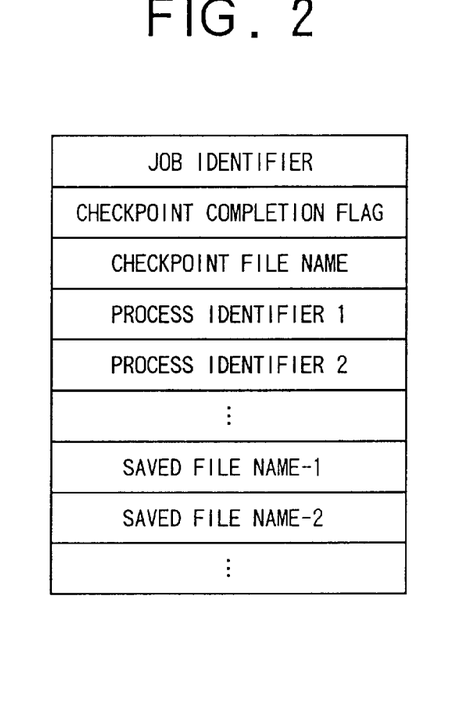
FIG. 2 shows the construction of job information.

A description will now be given, with reference to FIG. 2, of the job information 13-n. As shown in FIG. 2, the job information 13-n includes information necessary for controlling a job, such as a job identifier (job ID), a checkpoint process completion flag, a checkpoint file name, a plurality of process identifiers and a plurality of saved accessed file names.

The job identifier 13-n is a number to specify one of a plurality of jobs under the control of the loaded OS 6. The checkpoint process completion flag is information indicating whether the runtime environment of a job has already been saved as a checkpoint file. The checkpoint file name is a name of a file storing the job runtime environment. The process identifier is a number assigned to the process constituting the job. The saved file name is a name of a saved file which was active (used by the job) at checkpoint.

Figure 3:
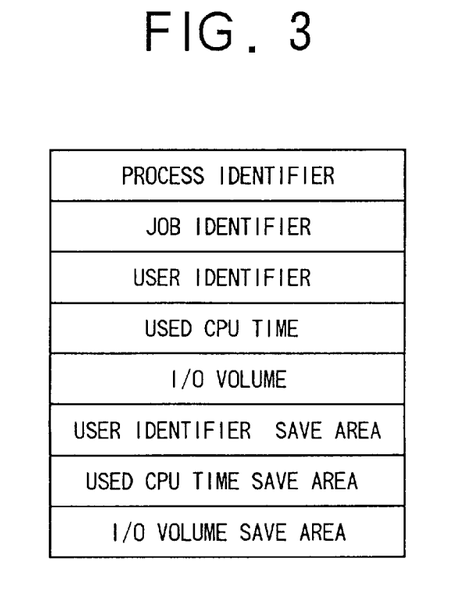
FIG. 3 shows the construction of process information.

A description will now be given, with reference to FIG. 3, of the process information. The process information includes the process identifier (process ID), the job identifier, the user identifier, the used CPU time, the I/O volume, the user identifier save area, the I/O volume save area and other information (not shown) necessary for process management.

The process ID is a number to specify one of a plurality of processes under the control of the OS 6. The job ID is a number assigned to the job to which the process belongs. The user identifier shows the user who executed the process.

The used CPU time is a cumulative time in which the CPU is used by the process after its execution is started. The I/O volume is a cumulative volume in bytes indicating the volume of input and output after the execution of the process is started. The used CPU time and the I/O volume are updated by the accounting unit 10 of OS 6 at an appropriate time during the execution of the process.

The used CPU time save area and the I/O volume save area are used to temporarily save the used CPU time and the I/O volume.

Figure 4:
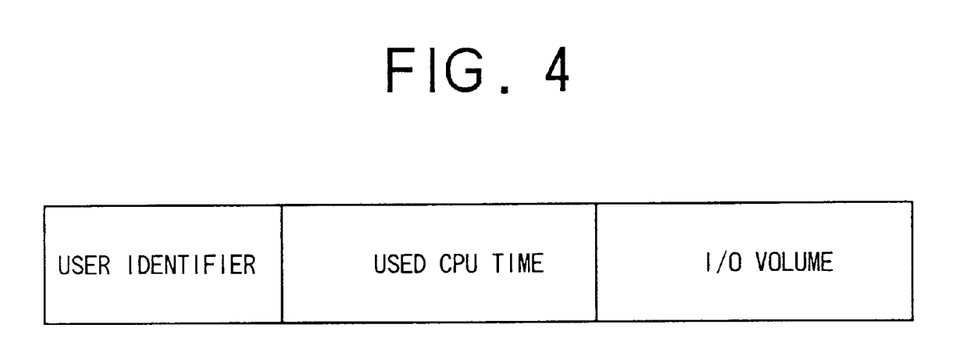
FIG. 4 shows a record format of an accounting file.

The accounting file 19 includes a plurality of records having a record format shown in FIG. 4. Each of the plurality of records includes the user identifier, the used CPU time, the I/O volume and the other necessary information (not shown). The user identifier identifies the target user for accounting. The used CPU time is a time in which the CPU is used to execute the user program. The I/O volume is a volume of input and output while the user program is being executed. The amount of money that the user is charged is determined based on this and other necessary information.

Figure 5:
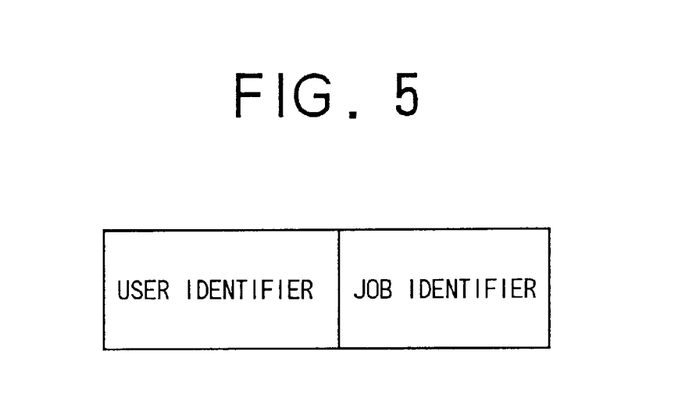
FIG. 5 shows a record format of a checkpoint instruction information table.

The checkpoint instruction information table 12 includes a plurality of records having a record format shown in FIG. 5. Each of the plurality of records in the checkpoint instruction information table 12 includes the user identifier identifying a user who has issued an instruction for setting a checkpoint of the job and the job ID of a job which is a target of freezing.

A description will now be given, with reference to FIG. 6, of the checkpoint process performed by the checkpoint process unit 8. The checkpoint process comprises a job freezing process and a process freezing process. The job freezing process is a process for saving the runtime environment of the job and is discussed with reference to FIG. 6. The process freezing process will be discussed with reference to FIG. 9.

Figure 6:
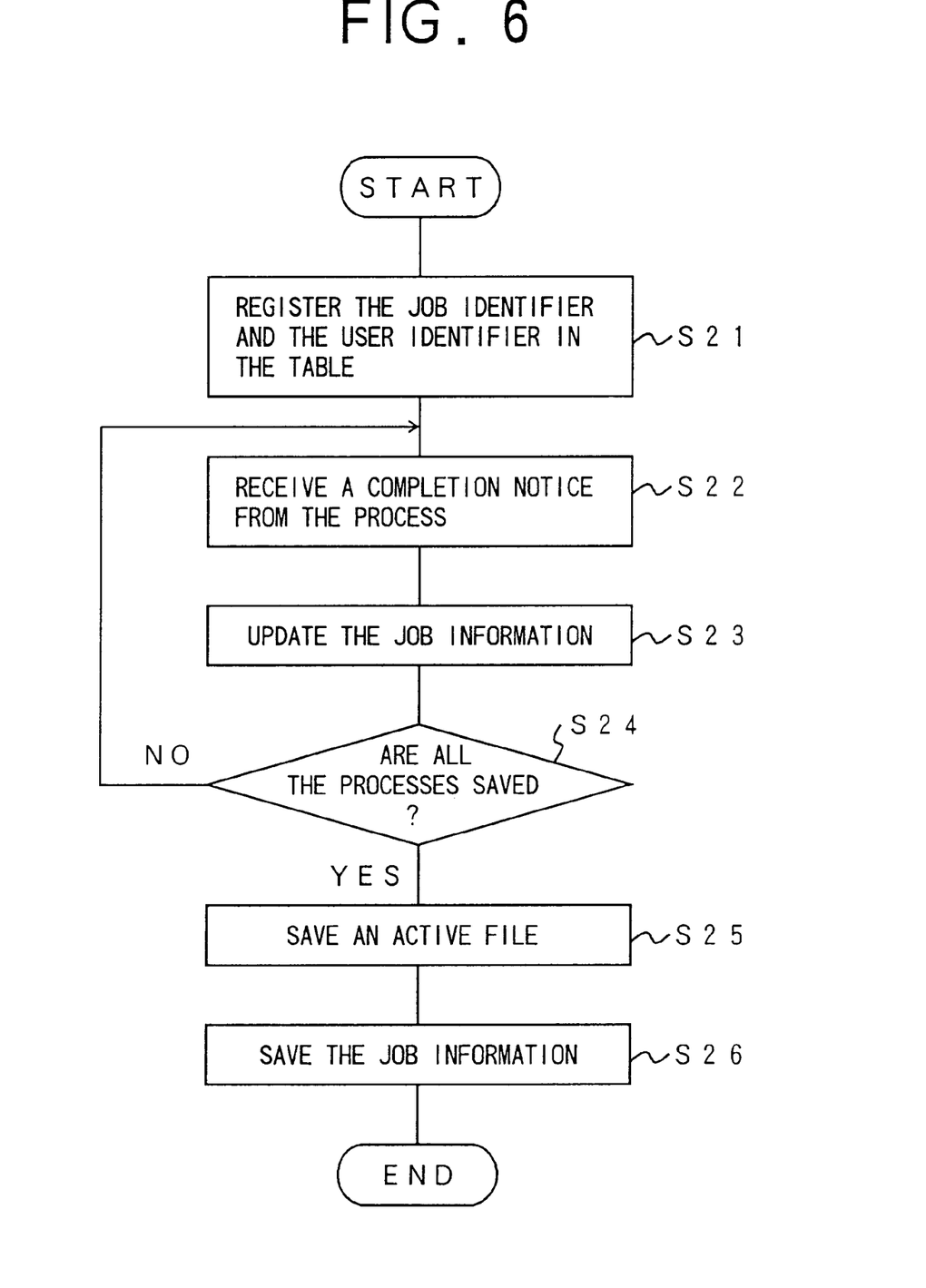
FIG. 6 shows a flow of a job freezing process constituting a checkpoint process.

Referring to FIG. 6, when the user (for example, a system administrator) issues an instruction for setting a checkpoint of a job via the terminal equipment unit 3, the user identifier identifying the issuing user and the job ID of the target job for setting a checkpoint are registered in the checkpoint instruction information table 12 (step S21).

When the registration of the information in the checkpoint instruction information table 12 is completed, a notification reporting the completion of the freezing process (saving of the runtime environment of the process—see FIG. 9) is received from the process constituting the job (step S22). When the notification has been received, the name of an active file reported is registered in a file already saved (step S23). A description of a process freezing will be given later.

Steps S22 and S23 are repeated until the completion of the freezing of all the processes constituting the target job has been reported (step S24).

The file having its name registered in the saved file is saved in the checkpoint file 16 (step S25) and the job information is saved in the checkpoint file 16 (step S26).

A description will now be given of the process freezing process (saving of the runtime environment of the process).

Figure 7:
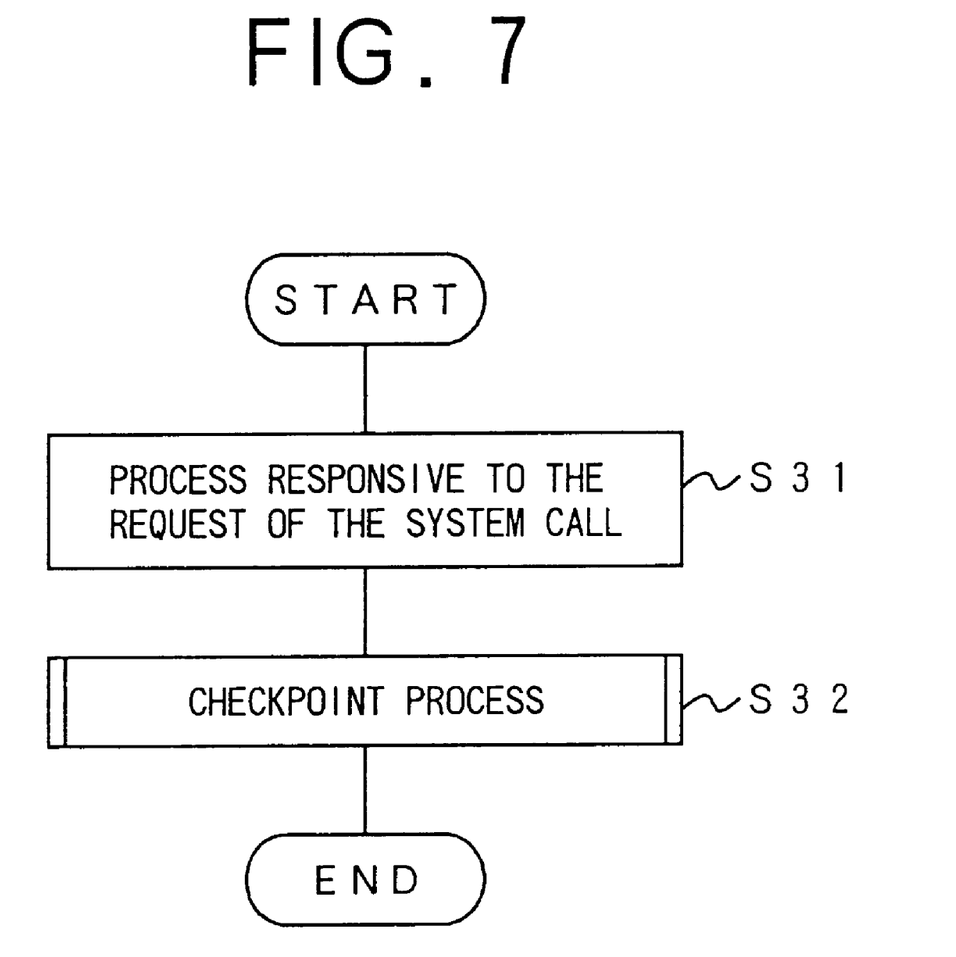
FIG. 7 shows a flow of a process responsive to a request for a system call with checkpoint facility.

It is to be noted that each process is executed by requesting a system call provided as a subroutine by the loaded OS 6. In this invention, the checkpoint process is carried out after a process responsive to the request of the system call is performed. FIG. 7 shows a flow of a process subsequent to a request for the system call and involving no input or output of files. A description will be given later of the process involving an access to the file.

Figure 9:
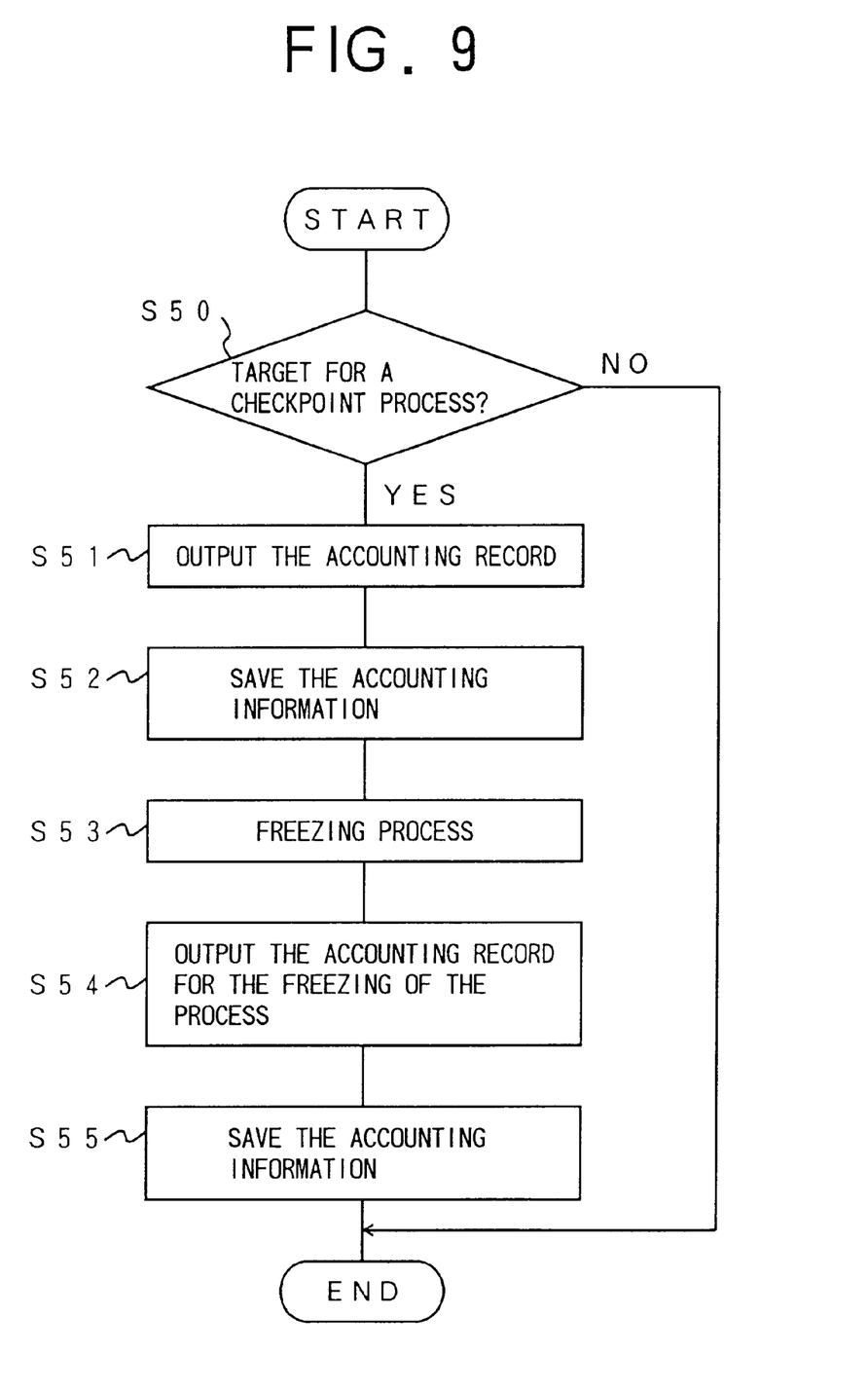
FIG. 9 shows a flow of a process freezing process constituting a checkpoint process.

FIG. 9 shows a flow of a process for freezing an execution state. The checkpoint instruction information table 12 is first referred to in order to determine whether the job to which the process belongs is a target for checkpoint setting. If the job is not a target, the process is terminated immediately (step S50).

Subsequently, an accounting record including the user identifier, a difference between the used CPU time and the value saved in the used CPU time save area and a difference between the I/O volume and the value saved in the I/O volume save area is output to the accounting file 19 (step S51). The used CPU time is saved in the used CPU time save area and the I/O volume is saved in the I/O volume save area (step S52). The process freezing step is then executed and the completion of the freezing process and the identity of the active file are reported to the loaded OS 6 (step S53). The report given in step S53 is the notification received in step S22 (see FIG. 6).

When the process freezing process is completed, the accounting record including the user identifier identifying the user issuing an instruction for setting a checkpoint of the job, a difference between the used CPU time and the value saved in the used CPU time save area and a difference between the I/O volume and the value saved in the I/O volume save area is output to the accounting file 19 (step S54). The used CPU time is saved in the used CPU time save area and the I/O volume is saved in the I/O volume save area (step S55). The process freezing process is then terminated.

Figure 8:
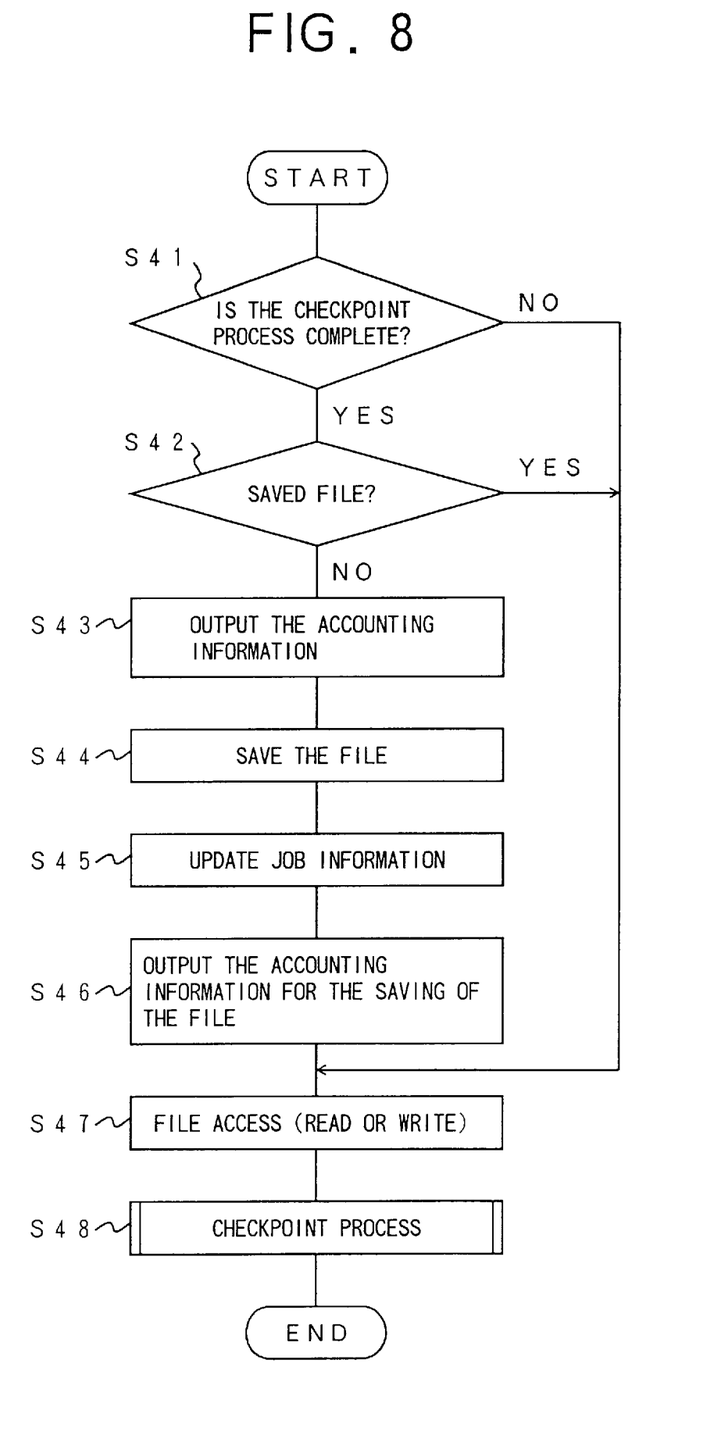
FIG. 8 shows a flow of a process responsive to a request for a system call involving a file access.

A description will now be given, with reference to FIG. 8, of a process responsive to a request for the system call process and involving an access to a file.

A determination is first made as to whether a checkpoint process is executed on the job to which the process requiring an access to a file belongs, based on the checkpoint process completion flag in the job information. If it is determined that the checkpoint process is not conducted, control is turned to step S47 (step S41).

If it is determined that the checkpoint process is executed, a determination is made as to whether the target file for the access is saved, based on the saved file name in the job information. If it is determined that the target file for the access has been saved, control is turned to step S47 (step S42).

The accounting information is then output to the accounting file (step S43). This process is the same as the processes in steps S51 and S52 of FIG. 9. That is, a difference between the used CPU time and the value saved in the used CPU time save area and a difference between the I/O volume and the value saved in the I/O volume save area is output to the accounting file 19. Further, the used CPU time is saved in the used CPU time save area and the I/O volume is saved in the I/O volume save area.

Subsequently, the target file for the access is saved (step S44). The name of the file saved in step S44 is registered in the saved file name constituting the job information located on the memory. The job information stored in the checkpoint file 16 is updated based on the job information located on the memory (step S45).

When the saving of the accessed file and the updating of the job information are completed, the account information is output (step S46). This process is the same as the processes in steps S54 and S55 of FIG. 9. That is, the accounting record including the user identifier identifying the user issuing an instruction for setting a checkpoint of the job, a difference between the used CPU time and the value saved in the used CPU time save area and a difference between the I/O volume and the value saved in the I/O volume save area is output to the accounting file 19. The used CPU time is saved in the used CPU time save area and the I/O volume is saved in the I/O volume save area.

Figure 10:
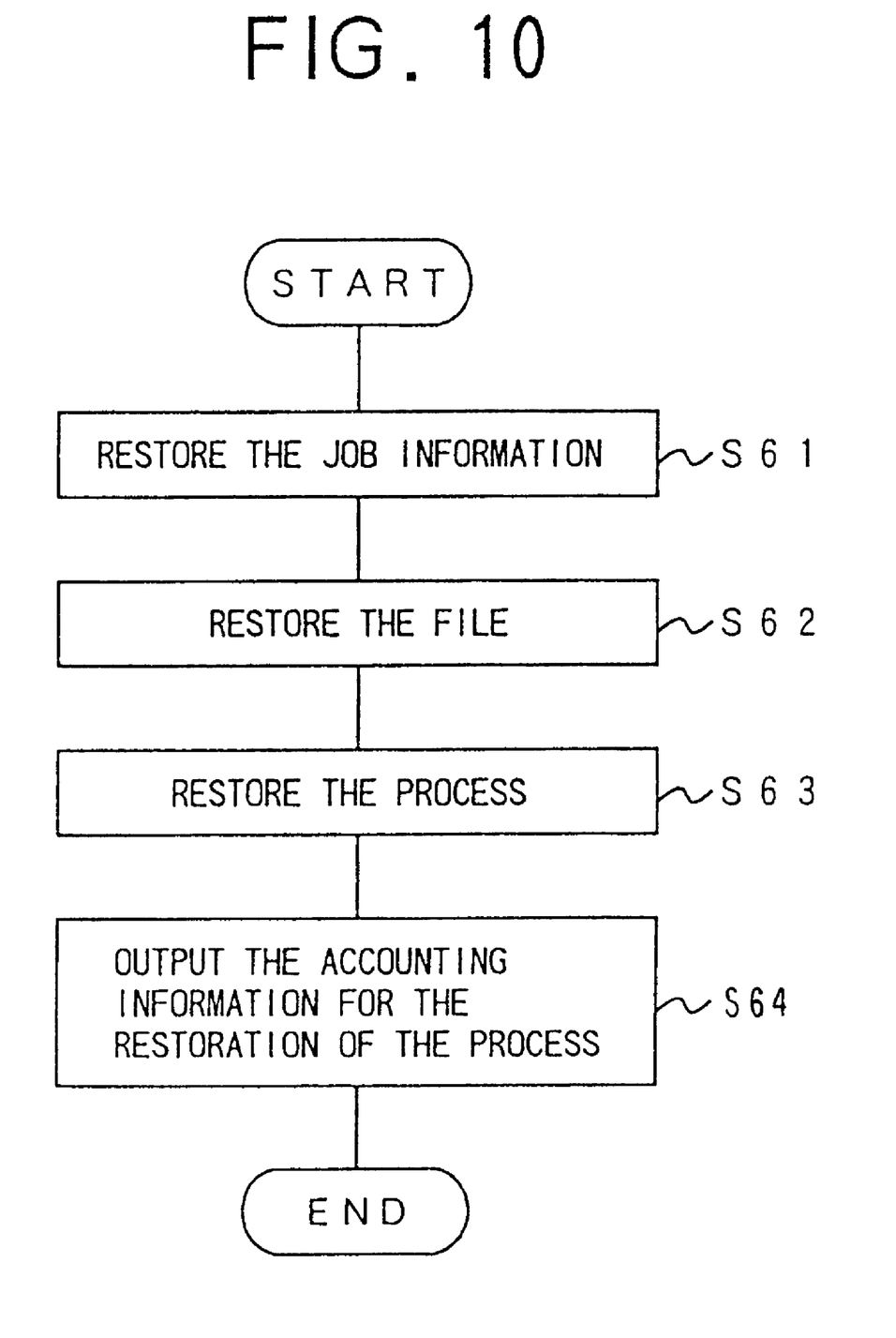
FIG. 10 shows a flow of a restart process.

A description will be given of a restart process executed by the restart process unit 9. A restart process is equal to a restart process for loading into the memory the runtime environment of the job saved in the checkpoint file 16 in the external storage device as a result of the checkpoint process.

When the restart of the job is requested, the job information is retrieved from the checkpoint file 16 and loaded into the memory (step S61).

The saved file (the file which was active when the job was frozen) is then restored based on the content of the information loaded into the memory (step S62). Subsequently, one or a plurality of processes comprising the job are restored (step S63). When these restorations are completed, the accounting information is output (step S64).

The output of the accounting information is the same as the corresponding processes in steps S54 and S55 shown in FIG. 9. That is, the accounting record including the user identifier identifying the user issuing an instruction for restarting the job, a difference between the used CPU time and the value saved in the used CPU time save area and a difference between the I/O volume and the value saved in the I/O volume save area is output to the accounting file 19. Further, the used CPU time is saved in the used CPU time save area and the I/O volume is saved in the I/O volume save area.

The aforementioned problems inherent in the related art are resolved by the computer system according to the embodiment described above.

Figure 11:
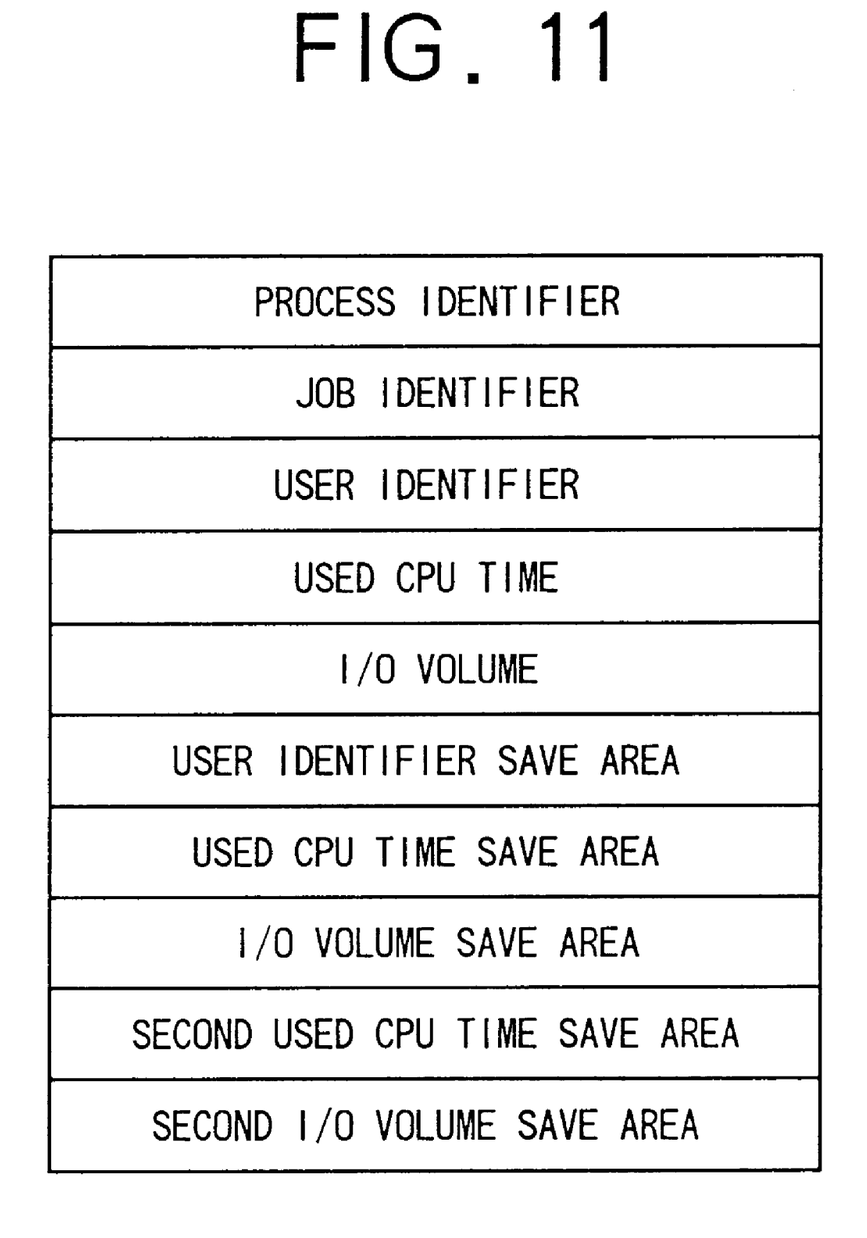
FIG. 11 shows a second structure of the process information.

A description will now be given, with reference to FIG. 11, of a variation of the embodiment of the present invention. Referring to FIG. 11, the process information may include a second used CPU time save area and a second I/O volume save area.

According to this variation, the accounting information available when the normal process is started (that is, when the checkpoint process ends) is saved in a second accounting information save area formed of the second used CPU time save area and the second I/O volume save area. The accounting information available when the normal process ends (that is, when the checkpoint process is started) is saved in a first accounting information save area formed of the second used CPU time save area and the second I/O volume save area. When the checkpoint process ends, an accounting record indicating an amount of money commensurate with a difference between the value saved in the first accounting information save area and the value saved in the second accounting information save area and charged to the account of the user executing the program (job, process) is output to the accounting file 19. An accounting record indicating the amount of money commensurate with a difference between the current accounting information and the value saved in the first accounting information save area and charged to the account of the user requesting the checkpoint of the job is output.

Thus, the variation of the embodiment also resolves the problems inherent in the related art.

While the description given above relates to a file access occurring after the checkpoint process, the present invention is not only designed for a file access but the same approach can be taken toward computer resources other than files.

While the description given above assumes that the job information is attached to a job and the process information is attached to a process. However, the job information and the process information may be stored in a memory managed by the OS or the external storage device.

While the invention has been described with reference to specific embodiments, the description of the specific embodiments is illustrative only and is not to be construed as limiting the scope of the invention. Various other modifications and changes may occur to those skilled in the art without departing from the spirit and scope of the present invention.

What is claimed is:

1. A computer system provided with an accounting facility for making account information indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

program executing means for executing the program; and output means for outputting to an accounting file, when the checkpoint process for a user program executed by said program executing means is completed, accounting information made by said accounting facility with respect to an execution of the user program.

2. A computer system provided with an accounting facility for making account information indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

program executing means for executing the program; and output means for outputting first accounting information and second accounting information to respective accounting files, the first accounting information being made by said accounting facility with respect to an execution of a user program, the second accounting information being made by said accounting facility with respect to executions of the checkpoint process and the restart process.

3. A computer system provided with an accounting facility for making an account record indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

program executing means for executing the program; and output means for outputting to an accounting file an accounting record made by said accounting facility with respect to executions of the checkpoint process and the restart process in accordance with programs to charge a user who instructs the checkpoint process and the restart process to start.

4. A computer system provided with a resource access facility for accessing a resource of said computer system and checkpoint and restart facility including a checkpoint process and a restart process, the checkpoint process suspending an execution of a program and maintaining a state of the program, the restart process reproducing the state of the program maintained by the checkpoint process and restarting the program, said computer system comprising:

program executing means for executing the program;

saving means for saving contents of an active resource;

determining means for determining, in the event that a unit of execution accessing a resource is preserved as a checkpoint by the checkpoint process, whether the accessed resource has been saved; and saving control means for saving, when said determining means determines that the accessed resource has not been saved, the contents of the accessed resource to be appended to the checkpoint.

5. A computer system provided with a resource access facility for accessing a resource of said computer system and checkpoint and restart facility including a checkpoint process and a restart process, the checkpoint process suspending an execution of a program and maintaining a state of the program, the restart process reproducing the state of the program maintained by the checkpoint process and restarting the program, said computer system comprising:

program executing means for executing the program;

saving means for saving contents of an active file;

determining means for determining, in the event that a unit of execution accessing a file is preserved as a checkpoint by the checkpoint process, whether the accessed file has been saved; and saving control means for saving, when said determining means determines that the accessed file has not been saved, the contents of the accessed file to be appended to the checkpoint.

6. A computer system provided with an accounting facility for making account information indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

a program executing unit executing the program; and an output unit outputting to an accounting file, during an execution of a user program, accounting information indicating a charge payable as a result of the execution of the user program.

7. A computer system provided with an accounting facility for making account information indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

a program executing unit executing the program; and an output unit outputting to an accounting file, when the checkpoint process for a user program executed by said program executing means is completed, accounting information made by said accounting facility with respect to an execution of the user program.

8. A computer system provided with an accounting facility for making account information indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

a program executing unit executing the program; and an output unit outputting first accounting information and second accounting information to respective accounting files, the first accounting information being made by said accounting facility with respect to an execution of a user program, the second accounting information being made by said accounting facility with respect to executions of the checkpoint process and the restart process.

9. A computer system provided with an accounting facility for making an account record indicating a charge payable as a result of an execution of a program and checkpoint and restart processing facility including a checkpoint process and a restart process, the checkpoint process suspending an execution of the program and maintaining a state of the program, the restart process reproducing the state of the program maintained by the checkpoint process and restarting the program, said computer system comprising:

a program executing unit executing the program; and an output unit outputting to an accounting file an accounting record made by said accounting facility with respect to executions of the checkpoint process and the restart process in accordance with programs to charge a user who instructs the checkpoint process and the restart process to start.

10. A computer system provided with an accounting facility and checkpoint and restart processing facility, comprising:

a program executing unit executing a program; and an output unit outputting, when a checkpoint process for a user program is completed, accounting information indicating a charge payable as a result of an execution of the user program to an accounting file.

11. A computer system provided with an accounting facility and checkpoint and restart processing facility, comprising:

a program executing unit executing a program; and an output unit outputting accounting information indicating a charge payable as a result of an execution of a user program and accounting information indicating a charge payable as a result of a checkpoint and restart process separately to respective accounting files.

12. A computer system provided with an accounting facility and checkpoint and restart processing facility, comprising:

a program executing unit executing a program; and an output unit outputting an accounting record charging a user, the user instructing a checkpoint and restart process for use of the checkpoint and restart facility, to an accounting file.

13. A computer system provided with a resource access facility and checkpoint and restart processing facility, comprising:

a program executing unit executing a program;

a saving unit saving contents of an active resource;

a determining unit determining, in the event that a unit of execution accessing a resource is preserved as a checkpoint, whether the accessed resource has been saved; and a saving unit saving, when said determining unit determines that the accessed resource has not been saved, the contents of the accessed resource to be appended to the checkpoint.

* * * * *

UNITED STATES PATENT AND TRADEMARK OFFICE
CERTIFICATE OF CORRECTION

PATENT NO.:     6,009,414
DATED      :    December 28, 1999
INVENTOR(S):    Takayuki HOSHIYA et al.

It is certified that error appears in the above-identified patent and that said Letters Patent is hereby corrected as shown below:

On the title page, [56] References Cited, U.S. Patent Documents, second reference, change "4,845,635" to --4,845,632--.

On the title page, [56] References Cited, Foreign Patent Documents, second reference, change "12/1988" to --12/1985--.

Signed and Sealed this

First Day of August, 2000

*Attest:*

Q. TODD DICKINSON

*Attesting Officer*      *Director of Patents and Trademarks*